Oct. 3, 1939.  J. DELORME  2,174,779
APPARATUS FOR EXTRUDING VARICOLORED PLASTICS
Filed Dec. 16, 1937    3 Sheets-Sheet 1

Inventor
Jean Delorme
By Leverance and
Van Antwerp
Attorneys

Oct. 3, 1939.  J. DELORME  2,174,779
APPARATUS FOR EXTRUDING VARICOLORED PLASTICS
Filed Dec. 16, 1937   3 Sheets—Sheet 2

Inventor
Jean Delorme
By Livenance and
Van Antwerp
Attorneys

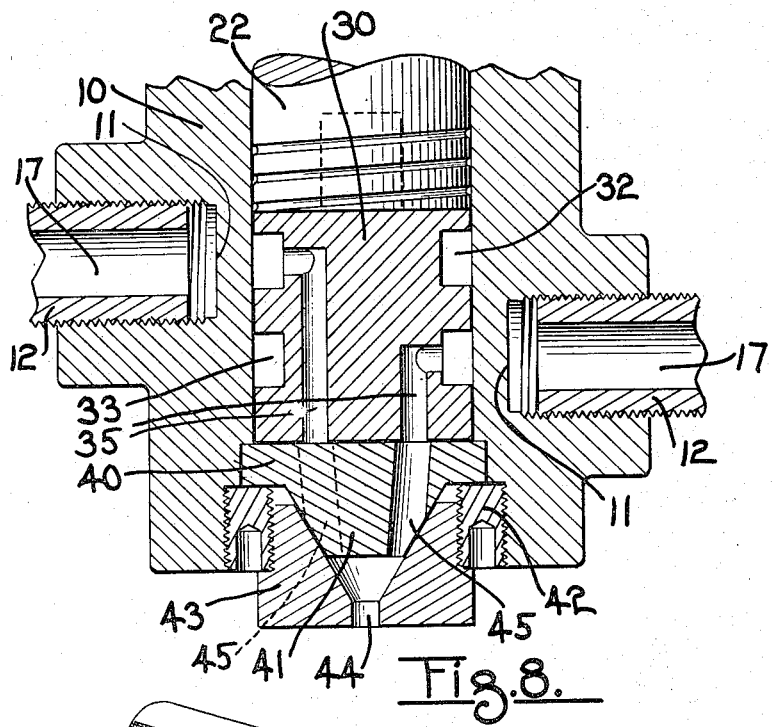
Fig. 8.
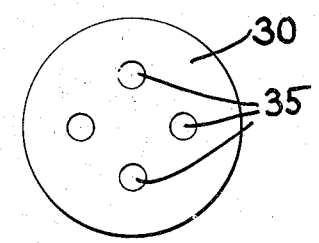
Fig. 9.
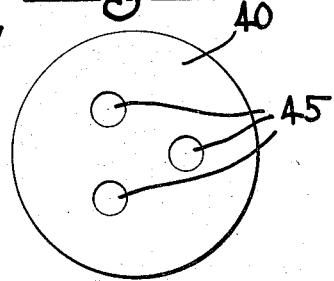
Fig. 10.
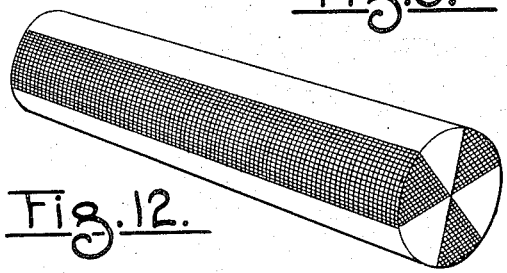
Fig. 12.
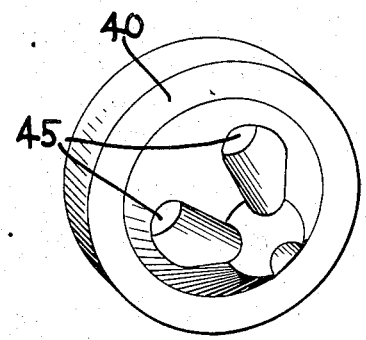
Fig. 11.
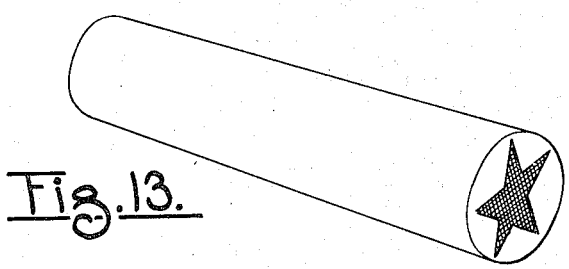
Fig. 13.
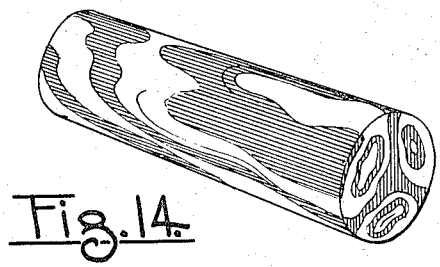
Fig. 14.
Fig. 15.
Inventor
Jean Delorme
By Linnance and
Van Antwerp
Attorneys Patented Oct. 3, 1939

2,174,779

UNITED STATES PATENT OFFICE 2,174,779

APPARATUS FOR EXTRUDING VARI-COLORED PLASTICS

Jean Delorme, Aubiere, France, assignor to George Morrell Corporation, Muskegon, Mich., a corporation of Michigan Application December 16, 1937, Serial No. 180,056

10 Claims. (Cl. 18—13)

This invention relates to a machine for extruding plastic materials of various colors into an elongated shape having either a continuous controlled design or a variegated design. Casein has been used as the plastic material upon which the machine operates but it is conceived that other substances may also be used with the machine.

The machine operates to evenly feed and control the extrusion of material of two or more different colors so that an elongated shape, such as a rod, composed of strips of the materials of the different colors is ejected with said strips of different colors shaped and combined by pressure to constitute a predetermined design both on the surface and in the cross section of the rod.

The machine will operate to produce the rod having a continuous design both on its surface and at any part of its cross section or it will operate to produce a variegated surface and cross sectional design and either of said designs will be accurately controlled as may be predetermined.

The machine operates to maintain accuracy of design by dividing the flow of material and introducing it at spaced locations into the passages of the extruding mechanism whereby equalization of pressure is obtained and maintained throughout the operation.

Various movable parts of the device are arranged to be driven at variable speeds relative to each other whereby the pattern of the product may be varied.

The machine provides various new and useful features of construction and operation as hereinafter more fully described and particularly pointed out in the claims, reference being had to the accompanying drawings, in which, Fig. 1 is a plan view, partially in section, of an end of the machine embodying the principal novelty of the invention.

Fig. 8 is a sectional plan showing the parts similar to Fig. 2 excepting that an extruding die is in place.

Fig. 9 is an end view of a cylinder having four outlet passages.

Fig. 10 is an end view of an extruding die having three passages.

Fig. 11 is a perspective view of a die having three passages.

Figs. 12, 13, 14 and 15 are perspective views of rods having different patterns produced by this machine.

Figure 1:
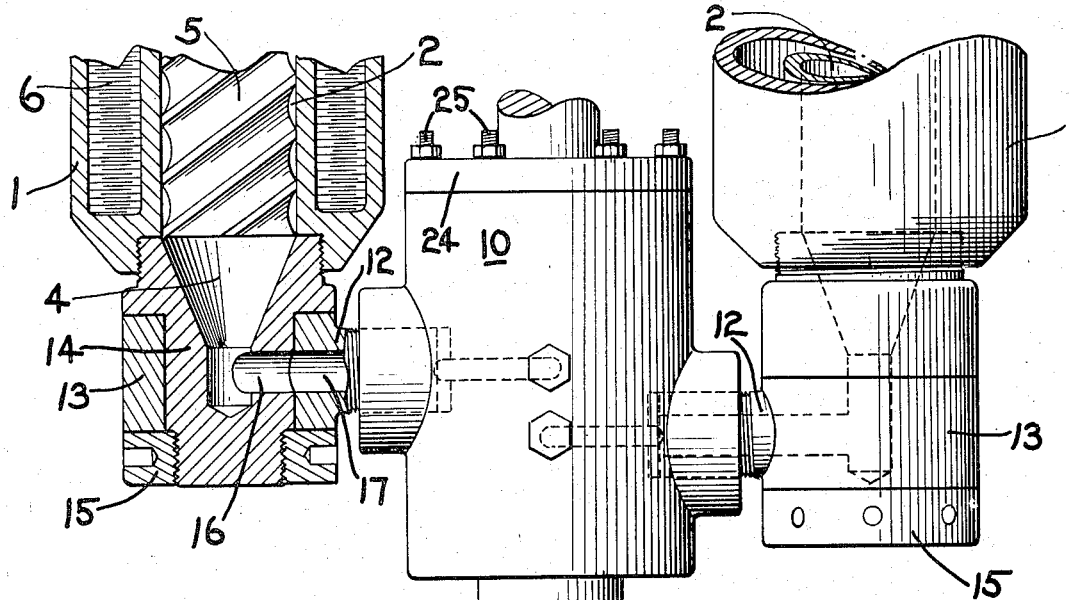

The invention utilizes a plurality of conventional extruding machines 1 which have cylindrical chambers 2 having outlets 4 and are provided with rotating screw conveyors 5 by means of which the material fed into the inlet will be mixed, compressed and ejected with considerable force. For use with casein the bodies of these extruding machines preferably have jackets 6 surrounding the cylinders 2 to contain either steam or hot water so that the contents are heated.

The extruding machines preferably have devices for feeding material into them at controlled rate of flow, this type of machine being exemplified in Fig. 1 of patent to George Morrell, No. 2,022,895, issued December 3, 1935.

The multiple color extruding device of this invention comprises a main body 10 having threaded sockets 11 on its exterior surface and in the device shown which is adapted to manipulate materials of two colors, which plurality of two is illustrative of the invention, the sockets 11 are preferably diametrically opposite of the body 10. Fittings 12 are screwed into the sockets 11 and have annular bodies 13 into which the delivery ends 14 of the extruding machines 1 are inserted and retaining nuts 15 are screwed onto the extremities of the delivery ends 14 to retain them in place in the fittings 12. Delivery passages 16 and 17 through the delivery ends 14 of the extruding machines and the fittings 12 serve to guide the plastic material from the extruding machines into the sockets 11 from where it enters the interior of the body 10 as hereafter described. The foregoing detailed structure connecting the plurality of extruding machines to the main body 10 is one form of embodiment of the invention, it being comprehended that various specific structures may be utilized for this purpose.

The body 10 has a cylindrical opening extending through it, preferably enlarged at 20 near one of its ends and again preferably enlarged and internally screw threaded at 21 at its outlet end. A rotatable head 22 is located in the cylindrical opening of the body 10 near one end thereof and bears against a thrust bearing 23 which is held in place on the body 10 by a cap 24 and bolts 25 which will retain the head within the body while permitting rotation thereof. A shaft 26 extending from the head 22 is operated upon by suitable mechanical means to rotate the head 22 when desired for the purpose hereafter described. The head 22 is provided at its inner end with a screw threaded socket 27.

The screw conveyors of the extruding machines 1, the devices to feed material into them and the shaft 26 of the rotatable head 22 are all arranged to be synchronously driven by any suitable means (not shown) and the driving connections for each of the respective devices is arranged to be varied so that the speed of any of them relative to any of the others can be changed. This interconnected variable driving mechanism may be of any suitable and conventional nature and specifically forms no part of the present invention.

A delivery cylinder 30 is located within the body 10 and has a screw threaded stud 31 which enters the threaded socket 27 and connects the cylinder 30 to the head 22 so that it is held in place within the body 10 and is rotated with the head 22 when desired. For the illustrated machine the cylinder 30 is provided with two annular grooves 32 and 33, one for each of the plurality of colors. If the machine were built to manipulate materials of more than two colors then a number of annular grooves corresponding to the number of colors would be provided. Two passageways 34 are provided in the body 10 for each socket 11, each two passages communicating with a respective socket 11 and emerging into the interior of the body 10 opposite one of the annular grooves 32 and 33 in the cylinder 30. These passages 34 communicate with the interior of the body 10 at circumferentially spaced locations and preferably diametrically opposite each other whereby material from each extruding machine will find its way into the interior of the body 10 and into the respective grooves 32 and 33 of the cylinder 30 at diametrically opposite sides thereof so that pressure exerted by the extruding machines will tend to be equalized in said annular grooves.

The cylinders 30 are removable and replaceable and are differently recessed for different designs of product but all have the same external dimensions and the same annular grooves 32 and 33, each of said grooves 32 and 33 to contain material of different colors from the respective extruding machines 1. Passages extend through the body of the cylinder 30 from the respective grooves 32 and 33 merging through the outer delivery end of the cylinder 30 which passages convey the materials of the respective colors. These passages vary greatly for different designs desired in the finished product and may be generally designated as 35.

An extruding die 40 is provided which is used for certain designs and omitted for others. It has a disk shaped portion located in the enlarged portion 20 of the interior of the body 10 and a conical portion 41 projecting outwardly therefrom. A nut 42 screwed into the threaded enlargement 21 of the interior of the body holds this extruding die in place. An outlet head 43, having a conical recess corresponding to the conical portion 41 of the die 40 screws into the interior of the nut 42. This head 43 has an outlet passage 44 which governs the size and shape of the extruded rod. The die 40 has passages 45 therethrough which communicate with the passages 35 of the cylinder 30 but the die 40, like the cylinder 30 is removable and replaceable and various of them are provided with passages 45 of various shapes and number to provide different designs and, as above stated, the extrusion die is omitted from the machine to produce certain designs.

*Operation*

The extruding machines 1 are simultaneously operated in the usual way by rotating the screw conveyors and continuously feeding plastic material, such as casein, of different colors into them. Of course, it is to be understood that the material as it is fed into the machines need not be in plastic state as in the case of casein which may enter the machine in granular form and becomes a plastic mass during its passage through the machine. It is to be understood that various plastic materials may be operated upon and that variety of colors may be used and that any plurality of colors may be combined, but for the purpose of this description the material will be called casein and two colors called light and dark will be described.

Both extruding machines 1 should be operated synchronously to insure uniformity of feed of material of the respective colors. The material passes from the extruding machines under considerable pressure through the passages 16 and 17 and the dividing passages 34 into the respective annular grooves 32 and 33 of the cylinder 30. From the cylinder 30 the respective colors are ejected through the passages 35 variously depending upon the number and shapes of the passages, whether the cylinder 30 is rotated during operation and whether the extruding die 40 is used.

Figure 2:
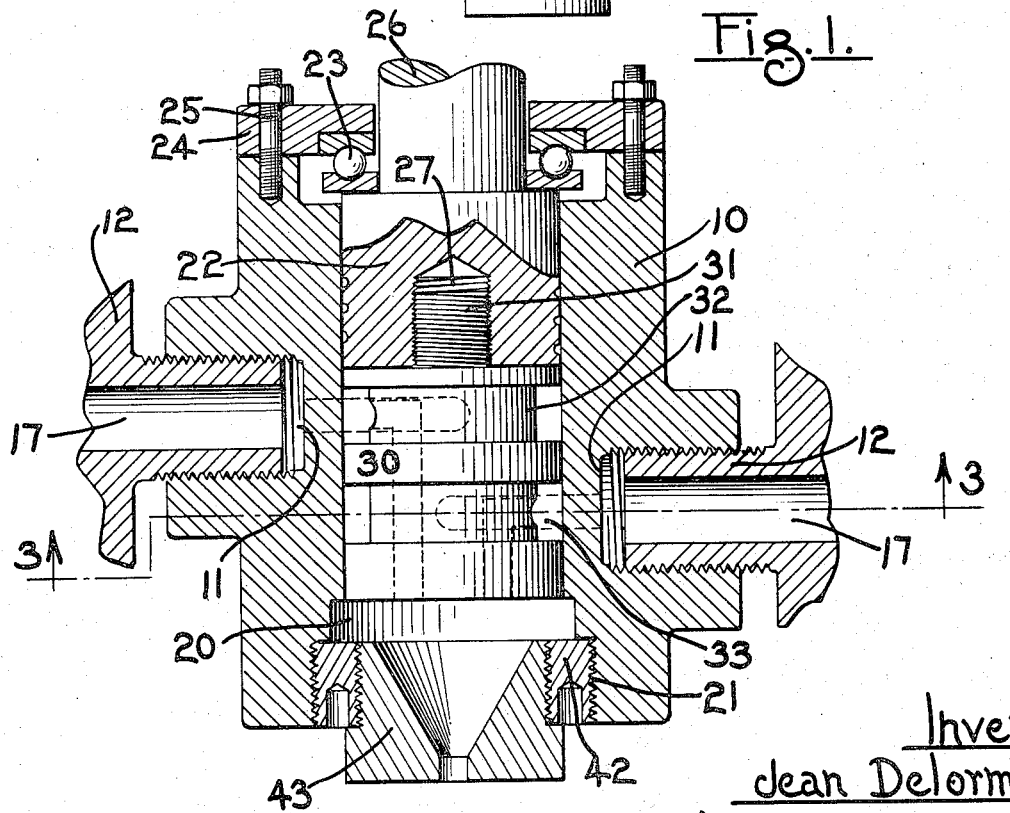
Fig. 2 is an enlarged cross section of the extrusion end of the machine.
Figure 3:
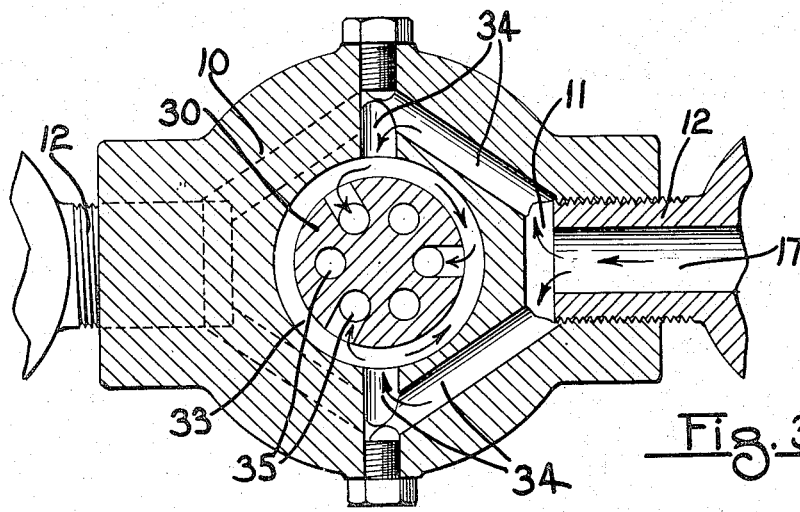
Fig. 3 is a sectional elevation on the line 3—3 of Fig. 2.
Figure 4:
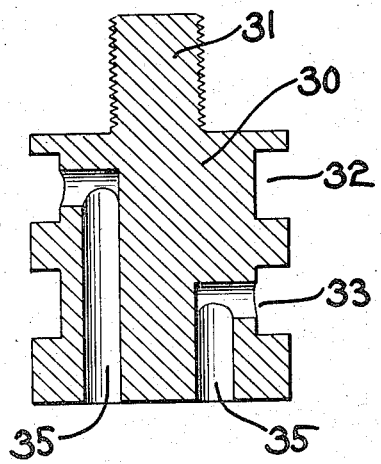
Fig. 4 is an enlarged axial section of the cylinder of the machine having passages to produce certain designs.
Figure 5:
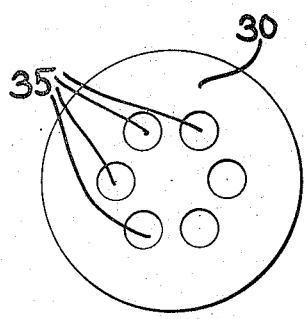
Fig. 5 is an end view of the cylinder of Fig. 4.

The design of Fig. 12 is produced by a cylinder 30 having passages as illustrated in Figs. 4 and 5 with the cylinder 30 stationary during operation and the extruding die 40 omitted as shown in Fig. 2. The cylinder has six passages 35 equally spaced about the axis of the cylinder and alternate passages 35 communicating with the grooves 32 and 33 whereby light and dark casein is extruded in equal quantities and in alternate arrangement into the chamber 20 of the body 10. The outlet from the chamber 20 is through the outlet head 43 which has a conical or tapered interior with the restricted outlet opening 44 which retards movement of the material and acquires considerable pressure for extrusion thereof. The material will completely fill the chamber 20 but having been injected therein in equal quantities of alternate colors evenly spaced, this arrangement will be maintained although the shapes of the colors will change and each will form a segment of the extruded round rod which round shape is produced by the shape of the outlet opening 44.

Figure 6:
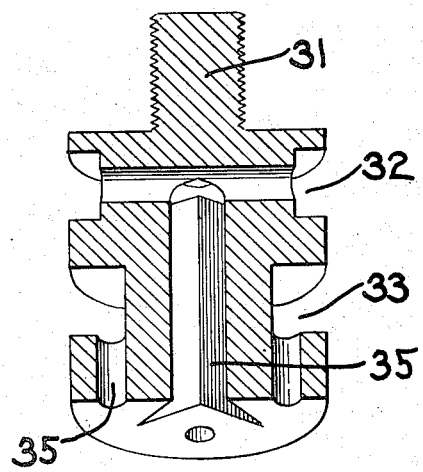
Fig. 6 is a sectional perspective of the cylinder having passages to produce other designs than those produced by the cylinder of Fig. 4.
Figure 7:
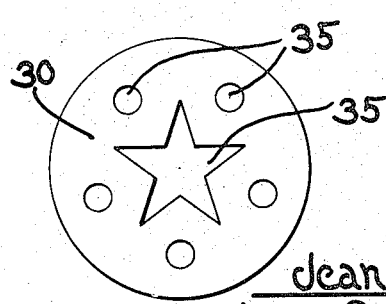
Fig. 7 is an end of the cylinder of Fig. 6.

The design of Fig. 13 consists of a star of one color extending through the center of the rod surrounded by the material of another color. This design is produced by the cylinder shown in Figs. 6 and 7 and this cylinder is not rotated during operation and the extruding die 40 is omitted. A five pointed star shaped passage 35 communicates with the groove 32 and ejects material of one color while five other passages 35 communicate with the other groove 33 and eject material of another color at locations between the points of the star and when that material so injected into the chamber 20 is forced through the chamber and out of the outlet head 43 through the passage 44 the material between the points of the star will assume the necessary shape to fill those spaces and to complete the circular cross sectional area.

The design shown by Fig. 14 is variegated both as to cross section and surface. This design is made by using a die 40 and cylinder 30 as shown in Figs. 8 and 9 and by rotating the cylinder 30 during operation. For this design the cylinder 30 has four passages 35 evenly spaced about the axis and alternately connecting with upper and lower grooves 32 and 33 whereby alternate light and dark colors will be ejected therefrom and the die 40 has three passages 45 with which the passages 35 register.

It will be noted that the number of passages in the cylinder 30 does not correspond with the number of passages through the die 40 and that the cylinder is rotated during operation while the die 40 remains stationary and also that different colors are ejected from the passages 35 in the cylinder. The result of this is that the different colors are constantly jumbled during operation. That is the three passages 45 of the stationary die are alternately fed by the four passages of the rotating cylinder ejecting alternate colors. The rotation of the cylinder is relatively slow which results in a gradual register of the openings from minimum to maximum so that there is not an abrupt color change at any time. While this design is an irregular variegated pattern it is controlled with general regularity and because of the controlled passage of the different colored material through the dies and uniform rotating of one die relative to the other it maintains the same average proportions of colors throughout the length of the completed rod and avoids gross inequality of distribution thereof which could result in an undesirable pattern.

The resultant pattern of Fig. 14 may be altered by varying the speed of rotation of the cylinder 30 relative to the speed of extrusion of the material but in any of such relative speeds the resultant pattern will be of a controlled though variegated and jumbled design.

The pattern of Fig. 15 is obtained by using a cylinder such as shown in Figs. 8 and 9 but omitting the die 40 and rotating the cylinder during extrusion. In this way the alternate colored extrusions of material are injected into the chamber 20 and from there ejected from the outlet 44 of the head 43 but because the cylinder is rotated during extrusion the different colored material takes on a twisted shape. In this design the cross section consists of alternate colored spirals and the surface has alternately colored helical stripes. This design may also be varied by altering the speed of rotation of the cylinder relative to the rate of extrusion of the material.

It will be seen that by the use of this machine a great variety of patterns in extruded rods may be obtained. The patterns may be varied by varying the passages in the cylinder 30 and die 40 by operating the machine with the cylinder 30 either stationary or rotating, by operating the machine with or without the extrusion die 40 and by changing the speed of rotation of the cylinder 30 relative to the rate of extrusion of the material. The design may further be changed by altering the rate of extrusion of material of one color relative to that of another color. Under all conditions the design is well controlled by the operation of the machine.

The invention is defined in the appended claims and is to be considered comprehensive of all forms of structure coming within their scope.

I claim:

1. A machine of the class described comprising, a body having a chamber, a rotatable cylinder in said chamber having a plurality of passages therethrough, a fixed member having a plurality of passages therethrough arranged to register with said passages in said rotatable cylinder, means for continuously supplying plastic materials of different colors respectively to said passages in said rotatable cylinder while it is rotating and for passing said material through said passages in the rotating cylinder and through said passages in said fixed member and an outlet passage communicating with the passages in said fixed member having an outlet opening of smaller cross sectional area than the combined cross sectional area of said passages through said fixed member.

2. The elements in combination defined in claim 1 in which the number of passages in the rotatable cylinder is different from the number of passages in the fixed member.

3. A device of the class described comprising, a body having a chamber and an outlet passage therefrom, a cylindrical member in said chamber and having a plurality of annular grooves, a passage leading from each groove through said cylindrical member and terminating at an end thereof, a plurality of pairs of passages in said body, each pair opening into said chamber opposite one of said grooves at diametrically opposite locations and means for supplying plastic material of different colors under pressure to each of said respective pairs of passages.

4. The elements in combination defined in claim 3, in which said cylindrical member is rotatable and means for rotating said cylindrical member.

5. The elements in combination defined in claim 3, in which said cylindrical member is rotatable, means for rotating said cylindrical member, a fixed member having a passage therethrough registering with said passages in said rotatable member, said passage in said fixed member communicating with said outlet passage in said body.

6. A machine of the class described comprising, a body having a cylindrical chamber, a cylindrical member rotatably mounted in said chamber and having two annular grooves, a passage through said cylindrical member communicating with each groove and terminating at an end of said cylindrical member, two pairs of passages in said body, the passages of each pair entering said chamber opposite each of said respective grooves at diametrically opposite locations, means for supplying plastic material of different colors under pressure to each of said respective pairs of passages, an additional member having passages therethrough mounted in said chamber adjacent the end of said cylindrical member at which said passages therein terminate, the passages of said cylindrical member and said additional member being located for registration, an outlet head closing said cylinder and having an outlet opening of less cross sectional area than the combined cross sectional area of the passages through said additional member and means for rotating said cylindrical member.

7. A device of the class described comprising a body having a chamber and an outlet opening, a rotatable member in said chamber having a plurality of annular grooves therein, passageways from each of said grooves through the member to said chamber, and means for injecting a different colored plastic material into each of said grooves said means also ejecting said material into said chamber and through said outlet opening.

8. The combination of elements defined in claim 7, combined with an additional member having passageways therethrough registering with the passageways in said member, the passageways of the additional member communicating with said outlet passage in said body.

9. The combination of elements defined in claim 7, combined with an additional member having passageways therethrough registering with the passageways in said chamber.

10. A device of the class described comprising, a body having a chamber and an outlet passage therefrom, a cylindrical member in said chamber having a plurality of annular grooves, a passage leading from each groove and extending through said cylinder, a plurality of pairs of passages in said body corresponding to the number of grooves, each pair opening into said chamber opposite one of said grooves, and means for supplying plastic material of different colors under pressure to each of said respective pairs of passages.

JEAN DELORME.